(12) United States Patent
Subhedar et al.

(10) Patent No.: US 10,733,044 B2
(45) Date of Patent: Aug. 4, 2020

(54) USE OF CACHE FOR CONTENT VALIDATION AND ERROR REMEDIATION

(71) Applicant: Microsoft Technology Licensing, LLC, Redmond, WA (US)

(72) Inventors: Sameeksha Subhedar, Redmond, WA (US); David Morton, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/029,999

(22) Filed: Jul. 9, 2018

(65) Prior Publication Data
US 2020/0012553 A1    Jan. 9, 2020

(51) Int. Cl.
*G06F 11/07* (2006.01)
*G06F 12/0802* (2016.01)

(52) U.S. Cl.
CPC ........ *G06F 11/0793* (2013.01); *G06F 11/073* (2013.01); *G06F 11/0751* (2013.01); *G06F 12/0802* (2013.01); *G06F 2212/1032* (2013.01)

(58) Field of Classification Search
CPC .............. G06F 11/0793; G06F 11/073; G06F 11/0751; G06F 12/0802; G06F 2212/1032
See application file for complete search history.

(56) References Cited

U.S. PATENT DOCUMENTS

| | | | |
|---|---|---|---|
| 5,594,863 A * | 1/1997 | Stiles | G06F 11/1435 714/15 |
| 8,612,382 B1 | 12/2013 | Patel et al. | |
| 2004/0255335 A1 * | 12/2004 | Fickle | H04L 65/605 725/135 |
| 2007/0067569 A1 | 3/2007 | Vittal et al. | |
| 2010/0293147 A1 * | 11/2010 | Snow | G06F 16/10 707/640 |
| 2011/0145242 A1 * | 6/2011 | Mehrotra | G06F 16/217 707/737 |
| 2011/0225128 A1 * | 9/2011 | Jarrett | G06F 8/61 707/692 |

(Continued)

OTHER PUBLICATIONS

"International Search Report and Written Opinion Issued in PCT Application No. PCT/US2019/037844", dated Aug. 23, 2019, 17 Pages.

(Continued)

*Primary Examiner* — Kyle Vallecillo

(57) ABSTRACT

The present disclosure relates to processing operations that enable use of cache memory for content validation and error remediation of content. Functionality of the cache is extended to enable interfacing between a cache and a validation component, which is configured to validate data read directly from the cache. Corrupted content may be updated and propagated to a permanent data store associated with an application/service, system, etc. Use of the cache may be optimal for targeting recent and/or heavily accessed content as well as a means for offloading data processing operations from a permanent data storage. Examples described herein extend to those in which data associated with an electronic file is already stored in cache memory as well as those in which update occurs directly to a permanent data storage and subsequently forwarded for validation processing.

20 Claims, 3 Drawing Sheets

(56) References Cited

U.S. PATENT DOCUMENTS

2015/0178506 A1\* 6/2015 Elovici ................ G06F 21/602
                                                                713/189
2017/0177867 A1   6/2017 Crofton et al.
2017/0286207 A1  10/2017 Campbell et al.
2018/0248895 A1   8/2018 Watson et al.

OTHER PUBLICATIONS

"International Search Report and Written Opinion Issued in PCT Application No. PCT/US2020/019401", dated Apr. 21, 2020, 12 Pages.

\* cited by examiner

100

USE OF CACHE FOR CONTENT VALIDATION AND ERROR REMEDIATION

BACKGROUND

Commonly, data is accessed and modified in distributed networking examples where one or more users may update content through an application or service. A piece of data that is stored in a distributed storage (e.g., cloud storage) can be updated by multiple users, from multiple devices, and also can be updated through the various services that act on the data. There is a possibility that the data being updated, gets corrupted during update processing. Among other reasons, this may be due to issues on any of the clients or the services that access the data.

Previously, in cases of content corruption, the cause of the issue was identified in an ad-hoc manner where attempts were made to track the issue to a specific client or service that may have accessed a distributed storage. Any errors that were found were fixed. However, this process makes it difficult to consistently identify the cause of the issue as well as identify data in production that may have entered into a corrupted state. Additionally, this type of processing is resource intensive from a processing efficiency standpoint, for example, tying up resources on a client-side as well as a server-side and further requiring additional processing operations to retrieve file data from data storages. A corruption remediation service may be configured to address corruption issues one by one and not recognize that an underlying data structure (for file content) is invalid. Consider an instance where an upload error occurs due to an error in the underlying data structure. Traditional corruption remediation processing may not update the underlying data structure to prevent this issue from occurring, meaning large amounts of data have the potential to enter a corrupted state.

SUMMARY

In view of the foregoing technical challenges, the present disclosure relates to processing operations that enable use of cache memory for content validation and error remediation of content. A cache is typically used to optimize performance by providing a temporary stop for data between a user and a permanent data store. In examples described herein, functionality of the cache is extended to enable interfacing between a cache memory and a validation component, which is configured to validate data read directly from a cache memory. If content is found to be corrupted, the content may be updated in the cache memory and propagated to a permanent data store associated with an application/service, system, etc. Use of the cache may be optimal for targeting recent and/or heavily accessed content as well as a means for offloading data processing operations from a permanent data storage (e.g., distributed data storage). Examples described herein extend to those in which data associated with an electronic file is already stored in cache memory as well as those in which update occurs directly to a permanent data storage and subsequently forwarded for validation processing. Updates may be forwarded to a cache memory so that users receive fresh (updated) data. This update processing may also be utilized to validate data that has recently been updated in the permanent data storage. For example, content may be updated (e.g., through a system, another application or service) which is not being directly edited by a real time processing system for an exemplary application/service. In such an instance, a notification may be provided to add content to a validation queue. The validation queue provides an asynchronous layer that listens to transactional flow and validates queued data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
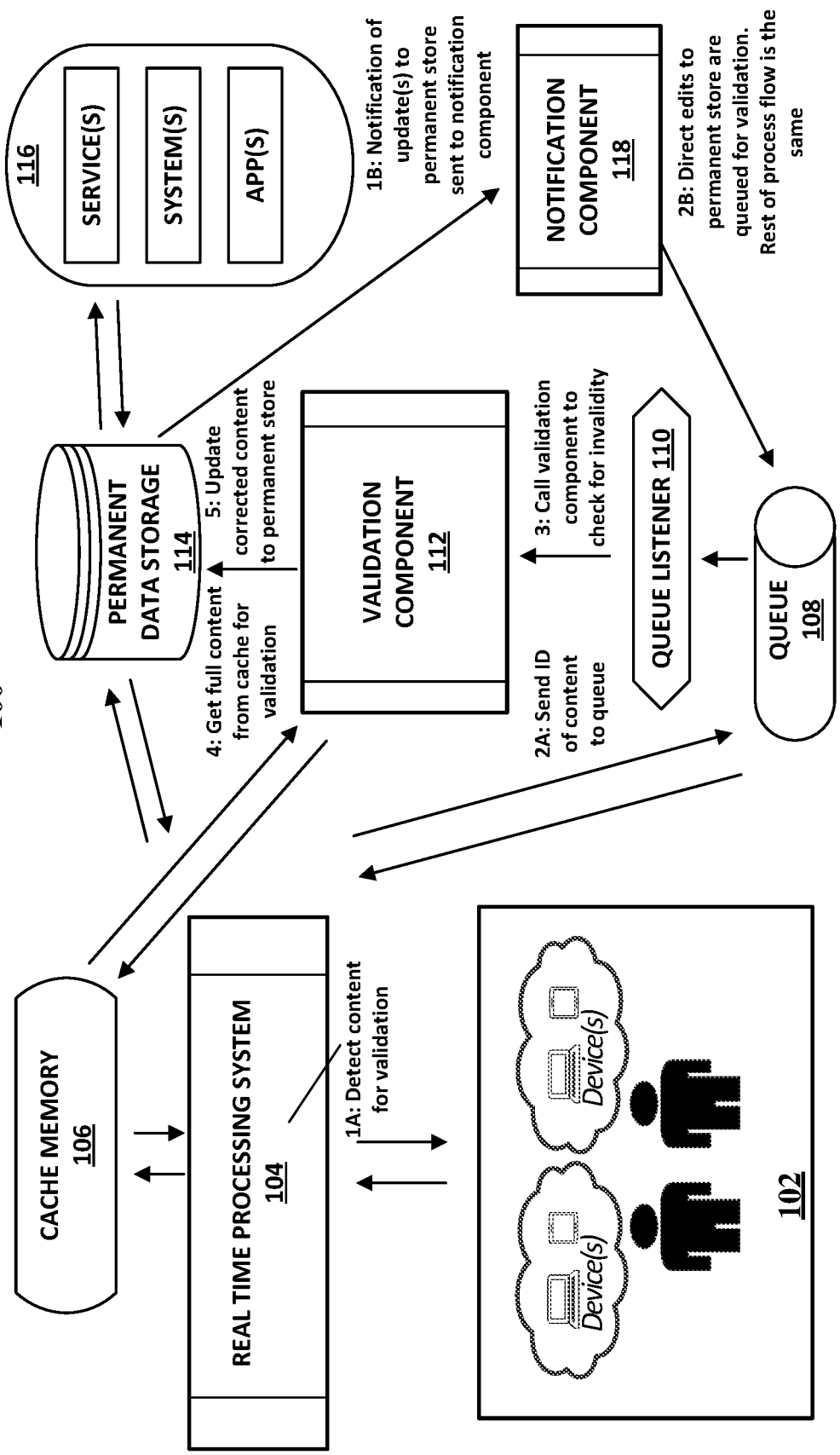
FIG. 1 illustrates an exemplary process flow providing exemplary components for content validation, with which aspects of the present disclosure may be practiced.

The present disclosure relates to processing operations that enable use of cache memory for content validation and error remediation of content. A cache is typically used to optimize performance by providing a temporary stop for data between a user and a permanent data store. In examples described herein, functionality of the cache is extended to enable interfacing between a cache memory and a validation component, which is configured to validate data read directly from a cache memory. If content is found to be corrupted, the content may be updated in the cache memory and propagated to a permanent data store associated with an application/service, system, etc. Use of the cache may be optimal for targeting recent and/or heavily accessed content as well as a means for offloading data processing operations from a permanent data storage (e.g., distributed data storage). Examples described herein extend to those in which data associated with an electronic file is already stored in cache memory as well as those in which update occurs directly to a permanent data storage. For example, content may be updated (e.g., through a system, another application or service) which is not being directly edited by a real time processing system for an exemplary application/service. In such an instance, a notification may be provided to add content to a validation queue, where data for validation may be propagated for validation processing. Updates may be forwarded to a cache memory so that users receive fresh (updated) data. This update processing may also be utilized to validate data that has recently been updated in the permanent data storage. For example, content may be updated (e.g., through a system, another application or service) which is not being directly edited by a real time processing system for an exemplary application/service. In such an instance, a notification may be provided to add content to a validation queue. The validation queue provides an asynchronous layer that listens to transactional flow and validates queued data.

In one non-limiting example, a data structure for an electronic file is read from a cache memory that is associated with an application or service. Content of the electronic file is validated based on an evaluation of the data structure read from the cache memory. For example, validation processing may comprise application of exemplary validation rules that are usable to evaluate any data associated with the data structure including but not limited to: exemplary data nodes of the data structure; and properties associated with those data nodes. Exemplary validation rules may programmatically evaluate a hierarchy of any type of data structure (e.g., data graph, data tree, hash) including evaluation of data nodes (e.g., parent nodes, child nodes), their corresponding sub-nodes as well as properties corresponding with respective data nodes. As such, in one example, a full data structure of an electronic file may be evaluated as compared with instances where only revisions to an electronic file are evaluated for correctness. This may improve accuracy in detection of content invalidity as well as enable fixes to prevent more widespread content corruption as well as instances of future content corruption.

Continuing the above example, one or more invalidities in the content may be detected based on a result of the validation processing. When an instance of corruption is detected, processing operations may be automatically executed to perform an in-memory fix of the data structure. That is, an exemplary data structure for an electronic file may be updated to correct one or more invalidities in the content of the electronic file. This may include direct fixes to specific portions of an exemplary data structure (and corresponding data/metadata) as well as correction of an entirety of a corrupted data structure. In one instance, update may occur through a validation component, where an updated data structure may be propagated to a permanent data storage that is associated with an exemplary application/service. The cache memory may also be directly updated in some instances. This validation processing enables an updated version of an electronic file to be directly accessed from the cache memory as well as retrieved from the permanent data storage. Update to the permanent data storage is important in instances where file data for an electronic file is cached as well as instances where the permanent data storage is a shared data storage that is accessible by other systems, applications/services, etc.

In any example, the exemplary cache is configured to be used as a store for detecting content that has already reached a corrupted state. This technique may be utilized in any system (including distributed systems/services) that have accessed to shared data storage including instances where data is not directly served to a cache memory. In-memory fixes are performed to correct invalidities in content in electronic files. In some instances, detection of invalidity may result in a determination that an entire data structure (for an electronic file) is corrupted. In such cases, an entire data structure (e.g., full data structure) may be re-rendered, for example, to prevent continued instances of corruption as well as mitigate future (potentially unforeseen) issues.

Exemplary technical advantages provided by processing described in the present disclosure including but are not limited to: extending functionality of a cache memory above the traditional means of use to enable interfacing for content validation; improving processing efficiency for content validation in real-time (or near real-time); reducing latency in distributed system/service exampled that include distributed data storage; extending functionality and usability for shared data storage systems; improved processing efficiency (e.g., reduction in processing cycles, saving resources/bandwidth) during for computing devices during execution of content validation processing; programmatic application of customized validation rules to improve validation processing; an ability to correct invalidities in large amounts of data; and extensibility to work with any type of data structures, among other technical advantages.

FIG. 1 illustrates an exemplary process flow 100 providing exemplary components for content validation, with which aspects of the present disclosure may be practiced. As an example, components of process flow 100 may be executed by an exemplary computing system (or computing systems) as described in the description of FIG. 3. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples.

In the illustration of process flow 100, there are numbered process flow steps that are provided to illustrate interaction between components shown in FIG. 1. For example, steps 1A-5 illustrate one example process flow for execution of validation processing described herein. Steps 1B-5 illustrate another exemplary process flow for execution of validation processing. It is to be recognized that the numbered process flow steps are aimed at illustrating non-limiting examples of interaction between components of FIG. 1. Process flow between components may be altered without departing from the spirit of the present disclosure.

Process flow 100 comprises user computing device(s) 102 (e.g., client computing device). An example of a user computing device 102 is a computing system (or computing systems) as described in the description of FIG. 3. A user may interact with an exemplary application/service (subsequently described in component(s) 116) through the user computing device(s) 102. For instance, the user may connect to an application/service through any number of different device modalities. In some examples, a user may connect to an application/service (e.g., distributed data storage service; productivity service) through different user computing devices 102, where non-limiting examples of such are: a smart phone, a laptop, a tablet, a desktop computer, etc. In other instances, a user may carry on a multi-modal communication with an application/service via multiple user computing devices. For example, a user may be accessing a first electronic file via a laptop or tablet and further connect to a collaboratively shared electronic file via a mobile computing device such as a cellular phone or smartphone.

As referenced above, exemplary applications/services may interface with other components of process flow 100 to enhance processing efficiency and functionality as described herein. For instance, specific components of process flow 100 may each be associated with one or more application/services to enable functionality of each of the components.

Applications/services 116 may be any type of programmed software. An exemplary application/service is a productivity application/service that is configured for execution to enable users to complete tasks on a computing device, where exemplary productivity services may be configured for access to content including electronic files/content retrieved via a network connection (e.g., Internet, Bluetooth®, infrared). Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, directory applications/services, mapping services, calendaring services, electronic payment services, digital data storage or distributed data storage applications/services, web conferencing applications/services, call communication applications/services, language understanding applications/services, bot framework applications/services, networking applications/service, and social networking applications/services, among other examples. In some examples, an exemplary productivity application/service may be a component of a suite of productivity applications/services that may be configured to interface with other applications/services associated with an application platform. For example, a word processing service may be included in a bundled service (e.g. Microsoft® Office365® or the like). Further, an exemplary productivity service may be configured to interface with other internet sources/services including third-party application/services, for example, to enhance functionality of productivity services during execution of operations such as retrieving file content, accessing file content, updating file content, validating content and storing content, among other examples.

An exemplary electronic file (or digital document) is a representation of content in an electronic media/electronic format such as a digital file. Examples of electronic files may vary where files may be created to work with any type of application/service. Types of electronic files are known to one skilled in the field. For instance, an electronic file may be created for a word processing service or notetaking service, where the electronic file may comprise authored content. Electronic files may be accessed natively, through applications stored on the user computing device. In alternate examples, electronic files may be accessed over a network connection, for example, where an electronic file is a web page accessed through a web browser or a distributed copy of a document that is being accessed but is remotely stored on a data storage other than the user computing device. Consider an instance where a user accesses a notetaking service for free-form information gathering and multi-user collaboration. The user may be utilizing the notetaking service to access and edit a shared electronic file that is collaboratively accessed by a group of users. On the back-end, the notetaking service may itself comprise distributed data storage (or shared data storage) for a user to store electronic files and/or the notetaking service may interface with a data storage application/service to provide data storage for said electronic files.

An exemplary real time processing system 104 is one or more components that are configured for the execution of data providing near-instantaneous output of data between user computing device(s) 102, hosting components 116 (e.g., applications, services, systems) and back-end processing components (e.g., cache memory 106, queue 110, queue listener 110, validation component 112, permanent data storage 114 and notification component 118). The real time processing system 104 may directly interface with user computing device(s) 102, among other components of process flow 100. As an example, the real time processing system 104 is configured so that customers are served data from a cache memory 106. The real time processing system 104 may be correlated to track data from the cache memory 106 that pertains to content that is being accessed or recently accessed (within a predetermined time period as specified by developers and/or data retention policies). Data from the cache memory 106 is populated from a permanent data store 114, which maintains data (e.g., electronic files, log data, version data) used for execution of exemplary hosting components 116. In execution, the real time processing system 104 is configured to take input of rapidly changing data and then provide output near instantaneously so that change over time is efficiently updated to the permanent data storage 114 and readily seen by the user. For instance, the real time processing system 104 may detect user requests for and/or access to electronic files and interface with a user computing device 102 to provide surface a representation of the electronic file through a user interface of an application or service. The cache memory 106 may store data for active access (or recent access) to an electronic file, where updates to that electronic file can be tracked and implemented on behalf of a user. Updates made to electronic files (e.g., via a user computing device 102) may be further propagated to the permanent data storage 114 via components used to validate that updates to content are correct. The real time processing system 104 may interface with other processing components of process flow 100 through APIs or the like. In some examples, the real time processing system 104 may track usage of electronic files within a specific application service. In other examples, the real time processing system 104 may comprise a plurality of components that are configured to track usage of electronic files across a plurality of applications/services that may share access to the permanent data storage 114.

In one example shown in FIG. 1, method steps for content validation processing may be initiated by the real time processing system 104, where the real time processing system 104 detects content for validation. In one example, detection of content for validation (step 1A of FIG. 1) may comprise detection that content of an electronic file has been edited or modified. This may include instances where users make changes to content of an electronic file (without saving) as well as those in which the user saves its changes. In another example, detection of content for validation may comprise detecting that a user has accessed an electronic file whether or not content of the electronic file is modified. The real time processing system 104 may be further configured to interface with an exemplary queue 108 for validation (validation queue), where the real time processing system 104 may transmit/submit identification of content (e.g., electronic file) to the queue 108 to further validation processing. An exemplary identification (ID) of content may be any type of data indicative of a specific electronic file and/or reference to a location of data of the electronic file within the cache memory 106 so that the data structure of the electronic file may be analyzed. An exemplary validation component 112 may be configured to utilize the ID to retrieve data for the electronic file from the cache memory 106 to execute validation processing.

As referenced above, the cache memory 106 (or cache) may interface with the real time processing system 104, among other components. An exemplary cache memory 106 is a hardware or software component that stores data so that future requests for data may be served faster. As an example, the cache memory 106 is a high-speed static random access memory (SRAM) that processing components (e.g., processor or microprocessor) can access more quickly (and more efficiently) than regular random access memory (RAM), which may be utilized for the permanent data storage 114. A cache is typically used to optimize performance by providing a temporary stop for data between a user and a permanent data store. In examples described herein, functionality of the cache memory 106 is extended to enable interfacing between the cache memory 106 and a validation component, which is configured to validate data read directly from a cache memory. In doing so, the cache memory 106 is configured as a data store for running validations on content. Content of an electronic file is validated based on an evaluation of a data structure of the electronic file that is read from the cache memory 106.

The cache memory 106 may further directly interface with the validation component 112. In doing so, the cache memory 106 may provide access to data associated with an electronic file so that the validation component 112 may execute validation processing as described herein. The cache memory 106 may be utilized to store any data (or metadata) associated with electronic files including underlying data structure(s) for an electronic file. Non-limiting examples of data structures comprise but are not limited to: graphs; data trees; and hashes, among other examples. Realtime updates typically are incremental edits to the data structure (e.g., graph structure) per user. As referenced in the foregoing, data updates may not always occur directly though the real time processing system 104. Other examples of validation are subsequently described such as when direct edits are made to the permanent data store 114 through other systems (applications/services) not using the cache memory 106. In such examples, a notification may be provided to a validation component 112 (providing a validation service) to execute validation processing on such content. In some examples, the permanent data storage 114 interfaces with the cache memory 106 to store a data structure for a direct edit within the cache memory 106 for execution processing to be validated. In other alternative instances (not shown), the validation component 112 may be configured to interface directly with the permanent data storage 114 to execute validation processing, thereby bypassing usage of the cache memory.

As previously referenced, data for an electronic file is not always readily found in the cache memory 106. A cache hit occurs when the requested data can be found in the cache memory 106, while a cache miss occurs when data is not found in the cache memory 106. Cache hits are served by reading data from the cache, which is faster than recomputing a result or reading from a slower data store. Developers may configure settings for storage of data within the cache memory 106 (including retention of data stored in a cache) for any length of time without departing from the spirit of the present disclosure. Parameters for storage of data within the cache memory 106 may comply with data retention policies/regulations as well as any user privacy laws or practices.

The cache memory 106 may further interface with the permanent data storage 114 to further validation processing. The permanent data storage 114 is a hardware data storage device or software component (e.g., virtual data storage) that is configured to store data. Examples of data storage devices and software components are known to one skilled in the field of art. An exemplary permanent data storage 114 acts as a dedicated storage for electronic files or other content that may be associated with a user account (or group user account), systems and/or one or more applications/services. For instance, the permanent data storage 114 may store content associated with a specific application/service. In another instance, the permanent data storage 114 may store content across a plurality of hosting components 116, which may include applications, services and system. In such an example, the permanent data storage 114 is a shared data storage for various hosting component 116. In further examples, the permanent data storage 114 may configured to store data associated with user accounts, where any type of electronic file may be stored across dedicated storage associated with a user account.

As an example, the permanent data storage 114 may be one or more distributed data storages accessible over a network connection. An example of a distributed data storage is a cloud-based data storage. A piece of data that is stored in the cloud can be updated by multiple users, from multiple devices, and also can be updated through the various services that act on the data. There is a possibility that the data that gets updated, gets corrupted in the process of update, either due to issues on any of the clients, or the services that access it. However, once data gets updated in the cloud in such corrupted states, due to any one client or user or service, all the users, devices and services that access the data henceforth get the corrupted content, and in some cases are not able to display the data back to the user. This can be perceived as data loss, or content corruption manifesting in failures to sync the data across devices. Also, once data goes into this state, there is no recovery mechanism to put it back in a corrected state. As such, the cache memory 106 and processing components for validation of content (e.g., validation component 112) are utilized to get corrupted data out of its invalid state and restored for user usage.

The permanent data storage 114 exchanges data with the cache memory 106, for example, in instances where data is actively being accessed (or was recently accessed). Moreover, in one instance, a data structure of an electronic file may be validated before an updated version of the electronic file is persisted on the permanent data storage 114. In some alternative instances, the permanent data storage 114 may store any version of an electronic file, where an update to content of the electronic file (or the underlying data structure) may cause a re-write over a previous version of an electronic file.

The real time processing system 104 may further interface with an exemplary queue 108 for validation processing (or validation queue). The queue 108 is configured to provide a queuing mechanism to systematically feed the validation component 112 with content to be validated. Any type of queuing mechanism may be implemented as known to one skilled in the field of art. Furthermore, the queue 108 may be further customized to manage exemplary validation processing so as to reduce latency during system operation. Exemplary validation processing is designed to improve processing efficiency of system operation and not interfere with a user's ability to access data. As a corollary, content for validation may be detected by the real time processing system 104 and propagated to the queue 108 for validation at a later point in time. Timing for execution of validation processing may correlate to a point in time where an electronic file is no longer being accessed so as not to affect service operation while content is being accessed.

An exemplary queue 108 may be configured with processing rules that enable prioritization (or de-prioritization) of data validation processing for specific content. For instance, processing rules may be set based on parameters including but not limited to: the type of electronic file; the type of modification to the content; the amount of access; the frequency of access; specific users that edited content; and processing workload for validation, among other examples. In some examples, the queue 108 may further apply criteria for evaluating whether a content modification is to be validated. The queue 108 may provide a decision point that is configured to determine whether to validate specific content or bypass the validation processing. Some of these decisions may also happen as part of the real time processing system 104 before content is queued for validation. Examples of criteria for determining whether content is to be validated or not may comprise but is not limited to: the type of electronic file; the type of modification to the content; frequency of validation processing on the content (e.g., prior validation processing on electronic file); the type of application/service associated with the content; and identification of discrepancies between versions of an electronic file, among other examples. In examples where an update meets the criteria for choice of content to be validated, content is queued for validation (with the identity of the content as stored in the cache memory 106).

An exemplary queue listener 110 may establish an interface between the queue 108 and the validation component 112. The queue listener 110 is a data object (or data objects) that acts as asynchronous event handler for propagating content for validation to the validation component 112. The queue listener 110 may implement a messaging interface that initiates communications between the queue 108 and the validation component 112 to feed the identification of the content to the validation component 112 when the validation component 112 has bandwidth. In some instances, the queue listener 110 may propagate identifications of content one by one. In other cases, identifications of content for validation may be transmitted in batches. The queue listener 110 may execute method step 3, shown in FIG. 1, where a call is executed to the validation component 112 for execution of validation processing of specific content (e.g., electronic file). Based on method step 3, the validation component 112 may execute validation processing.

As referenced above, the validation component 112 is implemented to execute validation processing of the content, where content may be checked for invalidity. Exemplary validation processing may comprise evaluation of full content of an electronic file, where an entirety of data structure for an electronic file may be evaluated. As such, in some examples, validation processing may periodically check a data structure of an electronic file to proactively identify and prevent potential issues that may arise during execution of an exemplary application/service. In some alternative instances, detection of content for validation may comprise identification of specific content that was edited within an electronic file (e.g., a portion of the electronic file). It is to be understood that validation processing described herein is applicable to instances where an entirety of a data structure is evaluated as well as those in which only a portion of the data structure (e.g., pertaining to specific content within a file) is evaluated.

When the validation component 112 receives a message, from the queue listener 110, with the identity of the content to be validated, the validation component 112 uses the identity (ID) to fetch the freshest content for that identity from the cache memory 106. Method step 4, shown in FIG. 1, illustrates the interaction between the cache memory 106 and the validation component 112, where the validation component 112 may either: 1) directly access the data structure (and associated data) for the electronic file in the cache memory 106; or 2) the cache memory 106 may propagate the data structure (and associated data) for the electronic file to the validation component 112 to execute further processing.

After the content is fetched from the cache memory 106, a set of validation checks is run on the data structure of the content to check if there are inconsistencies/corruption in the data structure of the electronic file. Content of the electronic file is validated based on an evaluation of the data structure read from the cache memory 106. For example, validation processing may comprise application of exemplary validation rules that are usable to evaluate any data associated with the data structure including but not limited to: exemplary data nodes of the data structure; and properties associated with those data nodes. Exemplary validation rules may programmatically evaluate a hierarchy of any type of data structure (e.g., data graph, data tree, hash) including evaluation of data nodes (e.g., parent nodes, child nodes), their corresponding sub-nodes as well as properties corresponding with respective data nodes. As such, in one example, a full data structure of an electronic file may be evaluated as compared with instances where only revisions to an electronic file are evaluated for correctness. This may improve accuracy in detection of content invalidity as well as enable fixes to prevent more widespread content corruption as well as instances of future content corruption. This processing may also be necessary because evaluation of the full content may be the only way to determine invalidity.

In executing validation processing, the validation component 112 may be configured to execute any of: computer programs, software agents, application programming interfaces (APIs), neural networks and/or machine-learning processing, among other examples. For instance, an exemplary machine learning model may be generated and trained to evaluate data structures for electronic files by applying validation rules that identify invalidities in a data structure (and specific properties within the data structure) as well as determine and apply applicable in-memory fixes to update a data structure to remove any invalidities. Creation, training and update of a machine learning model is known to one skilled in the field of art. In the present examples, a machine learning model may be further customized for validation processing using training data that adapts the machine learning model for detection of invalidities in file content and applying in-memory fixes to update a data structure of an electronic file. The validation component 112 is built with a set of validation checks and they check every part of the data structure for consistency and detect if the data is invalid. As one example, consider a graph as the underlying data structure for the content, with multiple different types of nodes with multiple properties, that are also cross-referenced in other nodes. In that example, a validation rule could be to check that nodes have the right ranges for the property values. Another one could be to check that the graph does not have any missing child nodes, or duplicate nodes. In another example, specific file properties such as file extensions, formatting, access privileges, etc., may be validated. The type of content validation could differ based on the data structure under consideration.

Once the validation component 112 has detected invalidity in the content, using the validation rules, the validation component 112 also attempts an in-memory fix of the content based on the programmed validation rules. Along with this type of invalid content detection, the validation rules may also have information on how to modify the data structure so as to correct the content within it, in order to get the content into a consistent state. One example of a fix to the "missing child node issue" could be search the graph to find if the data that was expected in the missing child is present elsewhere, and then reconstruct a child with that data and replace the missing child. Another fix for an "incorrect property value issue" could be to change the value of the property so that it aligns with the valid property values for that node while maintaining consistency. In another example, validation rules may be set to evaluate file extensions associated with specific content portions. In an instance where a file extension is identified as issue with corrupted content, an in-memory fix of the data structure for the electronic file may comprise processing operations that update the file extension, for example, to a recognized file extension for processing (e.g., display) of content.

When a version of the data structure is updated, the validation component 112 is programmed to write the updated content to the permanent data storage 114 of the real-time system. Method step 5 of FIG. 1 illustrates the interaction between the validation component 112 and/or the cache memory 106 with the permanent data storage 114. In one example, the validation component 112 writes the updated data structure in the cache memory 106 and directs the cache memory 106 to forward the updated data structure to the permanent data storage 114. In another example, the validation component 112 directly requests update of the electronic file with the permanent data storage 114. In that case, the validation component 112 propagates the updated data structure, for an electronic file, to the permanent data storage 114. For instance, the validation component 112 may obtain the updated data structure from the cache memory 106 and forward it to the permanent data storage 114.

Process flow 100 may further comprise hosting components 116. Hosting components 116 may comprise applications, services and/or systems, etc., that may store data/content on the permanent data storage 114 for execution thereof. For instance, the permanent data storage 114 may service a plurality of applications/services, where an application/service may be configured to work with the cache memory 106 while other applications/service may make edits to content without using the cache memory 106. Examples of applications and services have been provided in the foregoing description. Exemplary systems may comprise hardware components, software components or a combination thereof configured for processing of any type of data including content.

Process flow 100 may further comprise a notification component 118. An exemplary notification component 118 is one or more components configured to manage direct edits to the permanent data storage 114 that relate to non-cached content. For example, a user or a system may make an update to an electronic file that is not cached in the cache memory 106. In such an instance, the notification component 118 is configured to interface with the permanent data storage 114 and the queue 108 to initiate validation processing for content (e.g., an electronic file) that was directly edited on the permanent data storage 114. The notification component 118 is configured to interface with the permanent data storage 114 to receive notification(s) of direct updates to file content stored on the permanent data storage 114. FIG. 1 illustrates method step 1B, where a notification of an update to the permanent data storage 114 is transmitted to the notification component 118. The notification component 118 is further configured to interface with the queue 108 providing notification to add content associated with a direct edit to the validation queue. Moreover, the notification component 118 may be configured to instruct the cache memory 106 to retrieve the freshest content from the permanent data storage 114 so that the cache memory 106 has the latest content. FIG. 1 illustrates method step 2B, where a notification is transmitted to the queue 108 requesting that data associated with a direct update to the permanent data storage 114 is transmitted to the notification component 118. In some examples, the notification component 118, similar to the real time processing system 104, may provide a decision point that is configured to determine whether to validate specific content or bypass the validation processing. Examples of criteria for determining whether content is to be validated or not may comprise but is not limited to: the type of electronic file; the type of modification to the content; frequency of validation processing on the content (e.g., prior validation processing on electronic file); the type of application/service associated with the content; and identification of discrepancies between versions of an electronic file, among other examples. In examples where an update meets the criteria for choice of content to be validated, content is queued for validation. The rest of the method steps (3, 4, 5) shown in FIG. 1 after steps 1A and 1B are the same as described in the foregoing description.

Figure 2:
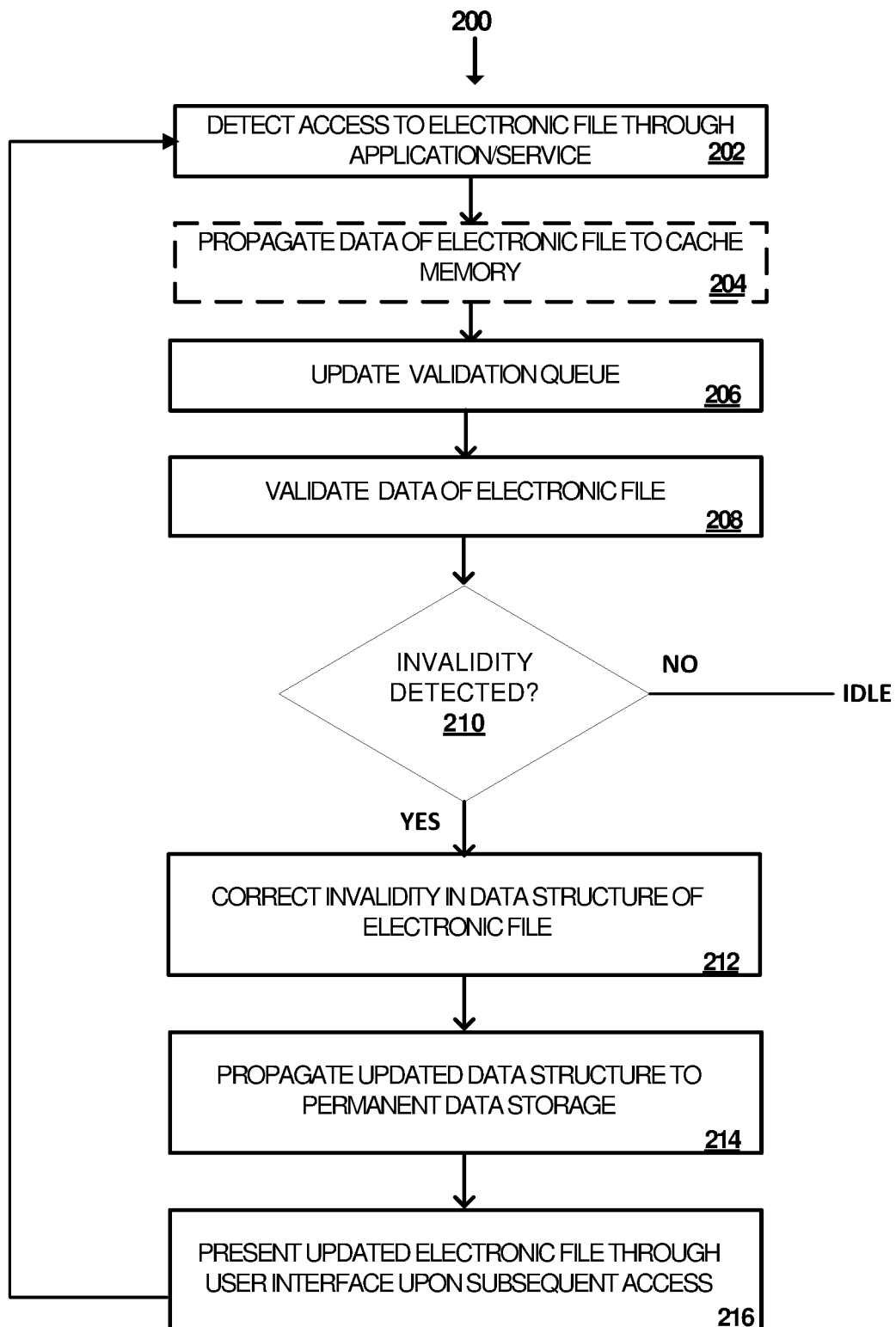
FIG. 2 illustrates an exemplary method related to content validation, with which aspects of the present disclosure may be practiced.

FIG. 2 illustrates an exemplary method 200 related to content validation, with which aspects of the present disclosure may be practiced. Processing operations described in method 200 may be executed by components described in process flow 100 (FIG. 1), where the detailed description in process flow 100 supports and supplements the recited processing operations in method 200. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 3:
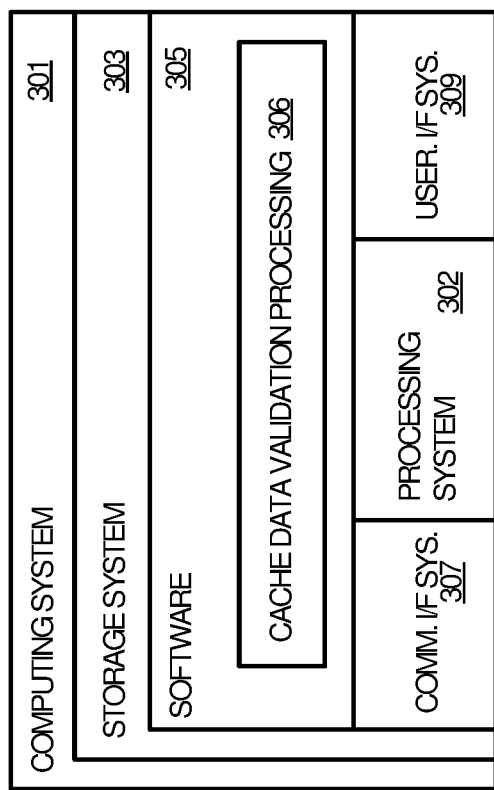
FIG. 3 illustrates a computing system suitable for implementing content validation processing as described herein, with which aspects of the present disclosure may be practiced.

As an example, method 200 may be executed across an exemplary computing system (or computing systems) as described in the description of FIG. 3. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where access is detected to an electronic file through an application/service. Detection (processing operation 202) of access to an electronic file may take many forms. As referenced in the foregoing description, access to an electronic file may be a trigger for execution of validation processing. Validation processing may evaluate an entire data structure of an electronic file. In some instances where electronic files have not been accessed for a long period of time, validation processing may not have been executed for a lengthy period of time (if at all). In that case, it may be useful to validate data structure(s) of an electronic file for corruption. This may be preventive to remediate any potential errors in a data structure before issues are surfaced during user usage. Another technical advantage to validation of an entire data structure is to repair files that have already entered a corrupted state and thus unable to display user content correctly. Any further access to such files may trigger a validation flow that can potentially repair the corrupted files. Further examples of detection (processing operation 202) of access to an electronic file comprise updates and direct edits to content of an electronic file. In one instance, a user may access an electronic file via a network connection, where the electronic file is stored on a data storage such as permanent data storage 114 as described in FIG. 1.

In some examples, method 200 may proceed to processing operation 204, where data of an electronic file may be propagated to a cache memory (e.g., cache memory 106 of FIG. 1). In one example, this may occur when access to the electronic file is detected (processing operation 102). In other examples, direct edits may be made to a permanent data storage, where notifications are propagated to other processing components (e.g., notification component 118, queue 108 and validation component 112 of FIG. 1) before electronic file data is propagated to the cache memory. In such examples, propagation of electronic file data may occur at processing operation 208, where data of the electronic file is validated. As referenced in the foregoing description, updates to cache memory need not happen directly via a validation component. In other instances, updated file data is propagated to a permanent data storage, where a cache memory may subsequently access the updated electronic file via interfacing with the permanent data storage.

Flow of method 200 may proceed to processing operation 206, where an exemplary validation queue may be updated with an identification of the electronic file. Processing operation 206 may be automatically executed based on detection of an update to content (e.g., electronic file). In another instance, propagation of identification of an electronic file to a validation queue may occur when access to an electronic file has ceased (e.g., user has stopped making updates and/or closed the file). An exemplary validation queue is queue 108 as described in the description of FIG. 1. Processing details for queuing of content for validation processing has been described in the foregoing description. As an example, processing operation 206 may comprise submitting identification of the electronic file to a validation queue. Content may be added to the validation queue by various processing components such as the real time processing system 104 and the notification component 118 as described in the description of FIG. 1.

At processing operation 208, validation processing executed. Validation processing comprises validating a data structure (and associated content) of the electronic file to check for corruption and/or errors. During validation processing (processing operation 208), an exemplary data structure of the electronic file is read from the cache memory, for example, based on the submitted identification being received at a validation component of an exemplary system. An exemplary validation component may be validation component 112 as described in FIG. 1. Processing operations for validation processing have been described in the foregoing description. As an example, validation processing may be initiated by reading a data structure for the electronic file from the cache memory. This may occur after any of the following instances: 1) when an electronic file is accessed; 2) when access to the electronic file has ceased; 3) after an update is made to content of the electronic file; and 4) based on prioritization settings of the validation queue.

As referenced in the foregoing description, content of the electronic file is validated based on an evaluation of the data structure read from the cache memory. For example, validation processing may comprise application of exemplary validation rules that are usable to evaluate any data associated with the data structure including but not limited to: exemplary data nodes of the data structure; and properties associated with those data nodes. Exemplary validation rules may programmatically evaluate a hierarchy of any type of data structure (e.g., data graph, data tree, hash) including evaluation of data nodes (e.g., parent nodes, child nodes), their corresponding sub-nodes as well as properties corresponding with respective data nodes. As such, in one example, a full data structure of an electronic file may be evaluated as compared with instances where only revisions to an electronic file are evaluated for correctness. This may improve accuracy in detection of content invalidity as well as enable fixes to prevent more widespread content corruption as well as instances of future content corruption.

Flow of method 200 may proceed to decision operation 210, where a result (or results) of validation processing are evaluated. In decision operation 210, it is determined whether any invalidities are detected in the data structure (and corresponding content) of the electronic file based on execution of the validation processing. In instances where no invalidities are detected, decision operation 210 branches NO and processing of method 200 remains idle until subsequent data is identified for validation. In examples where one or more invalidities are detected in the data structure of the electronic file (e.g., the electronic file or content of the electronic file is in a corrupted state), decision operation 210 branches YES and processing of method 200 proceeds to processing operation 212.

In processing operation 212, invalidity in the data structure of the electronic file is corrected. Exemplary processing operations for remediating corruption in the data structure of an electronic file have been described in the foregoing description of FIG. 1. For example, when an instance of corruption is detected, processing operations may be automatically executed to perform an in-memory fix of the data structure. That is, an exemplary data structure for an electronic file may be updated to correct one or more invalidities in the content of the electronic file. This may include direct fixes to specific portions of an exemplary data structure (and corresponding data/metadata) as well as correction of an entirety of a corrupted data structure. As reference in the foregoing description, exemplary validation rules may be programmed to both identify and correct invalidities in a data structure of an electronic file.

Flow of method 200 may proceed to processing operation 214, where an updated data structure may be propagated to a permanent data storage that is associated with an exemplary application/service. In one instance, update may occur through a validation component, where an updated data structure may be propagated to a permanent data storage that is associated with an exemplary application/service. The cache memory may also be directly updated in some instances. This validation processing enables an updated version of an electronic file to be directly accessed from the cache memory as well as retrieved from the permanent data storage. Update to the permanent data storage is important in instances where file data for an electronic file is cached as well as instances where the permanent data storage is a shared data storage that is accessible by other systems, applications/services, etc.

At processing operation 216, an exemplary user interface of an application/service is configured to present an updated electronic file. Presentation (processing operation 216) may occur on behalf of a user when a user next accesses the electronic file. In some examples, an exemplary electronic file may be updated while the user is still accessing a version of the electronic file. In such an instance, the user interface of an application/service may be adapted to refresh presentation of the electronic file so the user is accessing the electronic file in an uncorrupted state.

FIG. 3 illustrates a computing system 301 that is suitable for implementing content validation processing described herein, with which aspects of the present disclosure may be practiced. Computing system 301, which is representative of any system or collection of systems in which the various applications, services, scenarios, and processes disclosed herein may be implemented. Examples of computing system 301 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 301 may be implemented as a single apparatus, system, or device or may be implemented in a distributed manner as multiple apparatuses, systems, or devices. For example, computing system 301 may comprise one or more computing devices that execute processing for applications and/or services over a distributed network to enable execution of processing operations described herein over one or more services. Computing system 301 may comprise a collection of devices executing processing for front-end applications/services, back-end applications/service or a combination thereof. Computing system 301 comprises, but is not limited to, processing system 302, storage system 303, software 305, communication interface system 307, and user interface system 309. Processing system 302 is operatively coupled with storage system 303, communication interface system 307, and user interface system 309. Processing system 302 loads and executes software 305 from storage system 303. Software 305 includes one or more software components that are configured for cache data validation processing 306 and/or other applications/services of an application platform. Exemplary cache data validation processing comprises operations to access, read, validate and update data in a cache memory and/or interfacing with a permanent data storage. When executed by processing system 302, software 305 directs processing system 302 to operate as described herein for at least the various processes, operational scenarios, and sequences discussed in the foregoing implementations. Computing system 301 may optionally include additional devices, features, or functionality not discussed for purposes of brevity.

Referring still to FIG. 3, processing system 302 may comprise processor, a microprocessor and other circuitry that retrieves and executes software 305 from storage system 303. Processing system 302 may be implemented within a single processing device but may also be distributed across multiple processing devices or sub-systems that cooperate in executing program instructions. Examples of processing system 302 include general purpose central processing units, graphical processing units, application specific processors, and logic devices, as well as any other type of processing device, combinations, or variations thereof.

Storage system 303 may comprise any computer readable storage media readable by processing system 302 and capable of storing software 305. Storage system 303 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 303 may also include computer readable communication media over which at least some of software 305 may be communicated internally or externally. Storage system 303 may be implemented as a single storage device but may also be implemented across multiple storage devices or sub-systems co-located or distributed relative to each other. Storage system 303 may comprise additional elements, such as a controller, capable of communicating with processing system 302 or possibly other systems.

Software 305 may be implemented in program instructions and among other functions may, when executed by processing system 302, direct processing system 302 to operate as described with respect to the various operational scenarios, sequences, and processes illustrated herein. For example, software 305 may include program instructions for implementing an exemplary cache data validation processing 306 and/or other applications/services of an application platform, as described in the foregoing description.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 305 may include additional processes, programs, or components, such as operating system software, virtual machine software, or other application software. Software 305 may also comprise firmware or some other form of machine-readable processing instructions executable by processing system 302.

In general, software 305 may, when loaded into processing system 302 and executed, transform a suitable apparatus, system, or device (of which computing system 301 is representative) overall from a general-purpose computing system into a special-purpose computing system customized to process data and respond to queries. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer readable storage media are implemented as semiconductor-based memory, software 305 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 307 may include communication connections and devices that allow for communication with other computing systems (not shown) over communication networks (not shown). Communication interface system 307 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 309 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may also include associated user interface software executable by processing system 302 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 301 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
submitting identification of an electronic file to a validation queue based on a detection of an update to data associated with the electronic file;
reading a data structure for the electronic file from a cache memory associated with an application or service based on the submitting of the identification of the electronic file to the validation queue;
validating content of the electronic file based on an evaluation of the data structure read from the cache memory, wherein the validating comprises applying validation rules that evaluate the data structure and properties associated with the data structure;
detecting one or more invalidities in the content based on a result of the validating;
updating, in the cache memory, the data structure to correct the one or more invalidities in the content; and
propagating the updated data structure from the cache memory to a permanent distributed data storage for the application or service to enable subsequent access to the electronic file through the application or service.

2. The method of claim 1, further comprising: detecting access by a user to the electronic file through the application or service; and propagating the data structure for the electronic file from the permanent data storage to the cache memory based on a detection of the access by the user to the electronic file.

3. The method of claim 1, further comprising: detecting that user access by a user, through the application or service, to the electronic file has ceased, wherein the reading of the data structure from the cache memory occurs based on a detection that the user access to the electronic file has ceased.

4. The method of claim 1, wherein the data associated with the electronic file is one or more of: metadata associated with the electronic file and content of the electronic file.

5. The method of claim 1, further comprising: detecting an update to a version of the electronic file made through the permanent distributed data storage for the application or service; and propagating data associated with the updated electronic file to the cache memory, wherein the reading accesses the data structure for the updated electronic file.

6. The method of claim 1, wherein the detecting of the one or more invalidities comprises a detection that a data node of the data structure is lost, and wherein the updating of the data structure further comprises: executing an in-memory fix of the data structure that recreates the data node that is lost, and wherein the updated data structure comprises the recreated data node.

7. The method of claim 1, wherein the detecting of the one or more invalidities comprises a detection that a file extension of the content is invalid, and wherein the updating of the data structure further comprises: executing an in-memory fix of the data structure that updates the file extension, and wherein the updated data structure comprises the updated file extension.

8. The method of claim 1, wherein the detecting of the one or more invalidities comprises determining that data structure is corrupted based on a threshold evaluation of the one or more invalidities, and wherein the updating of the data structure further comprises: re-rendering the entire data structure based on a result of the threshold evaluation.

9. A system comprising:
at least one processor; and
a memory, operatively connected with the at least one processor, storing computer-executable instructions that, when executed by the at least one processor, causes the at least one processor to execute a method that comprises:
submitting identification of an electronic file to a validation queue based on a detection of an update to data associated with the electronic file;
reading a data structure for the electronic file from a cache memory associated with an application or service based on the submitting of the identification of the electronic file to the validation queue;
validating content of the electronic file based on an evaluation of the data structure read from the cache memory, wherein the validating comprises applying validation rules that evaluate the data structure and properties associated with the data structure;
detecting one or more invalidities in the content based on a result of the validating;
updating, in the cache memory, the data structure to correct the one or more invalidities in the content; and
propagating the updated data structure from the cache memory to a permanent distributed data storage for the application or service to enable subsequent access to the electronic file through the application or service.

10. The system of claim 9, wherein the executed method further comprises: detecting access by a user to the electronic file through the application or service; and propagating the data structure for the electronic file from the permanent data storage to the cache memory based on a detection of the access by the user to the electronic file.

11. The system of claim 9, wherein the executed method further comprises: detecting that user access by a user, through the application or service, to the electronic file has ceased, wherein the reading of the data structure from the cache memory occurs based on a detection that the user access to the electronic file has ceased.

12. The system of claim 9, wherein the data associated with the electronic file is one or more of: metadata associated with the electronic file and content of the electronic file.

13. The system of claim 9, wherein the executed method further comprises: detecting an update to a version of the electronic file made through the permanent distributed data storage for the application or service; and propagating data associated with the updated electronic file to the cache memory, wherein the reading accesses the data structure for the updated electronic file.

14. The system of claim 9, wherein the detecting of the one or more invalidities comprises a detection that a data node of the data structure is lost, and wherein the updating of the data structure further comprises: executing an in-memory fix of the data structure that recreates the data node that is lost, and wherein the updated data structure comprises the recreated data node.

15. The system of claim 9, wherein the detecting of the one or more invalidities comprises a detection that a file extension of the content is invalid, and wherein the updating of the data structure further comprises: executing an in-memory fix of the data structure that updates the file extension, and wherein the updated data structure comprises the updated file extension.

16. The system of claim 9, wherein the detecting of the one or more invalidities comprises determining that data structure is corrupted based on a threshold evaluation of the one or more invalidities, and wherein the updating of the data structure further comprises: re-rendering the entire data structure based on a result of the threshold evaluation.

17. A computer readable storage media storing computer-executable instructions that, when executed by at least one processor, causes the at least one processor to execute a method comprising:

submitting identification of an electronic file to a validation queue based on detecting that user access to the electronic file has ceased;

reading a data structure for the electronic file from a cache memory associated with an application or service based on the submitting of the identification of the electronic file to the validation queue;

validating content of the electronic file based on an evaluation of the data structure read from the cache memory, wherein the validating comprises applying validation rules that evaluate the data structure and properties associated with the data structure;

detecting one or more invalidities in the content based on a result of the validating;

updating, in the cache memory, the data structure to correct the one or more invalidities in the content; and propagating the updated data structure from the cache memory to a permanent distributed data storage for the application or service to enable subsequent access to the electronic file through the application or service.

18. The computer readable storage media of claim 17, wherein the executed method further comprises: detecting access by a user to the electronic file through the application or service; and propagating the data structure for the electronic file from the permanent data storage to the cache memory based on a detection of the access by the user to the electronic file.

19. The computer readable storage media of claim 17, wherein the detecting that the user access has ceased to the electronic file comprises receiving an indication from the application or service that a user has recently closed the electronic file.

20. The computer readable storage media of claim 17, wherein the detecting of the one or more invalidities comprises determining that data structure is corrupted based on a threshold evaluation of the one or more invalidities, and wherein the updating of the data structure further comprises: re-rendering the entire data structure based on a result of the threshold evaluation.

* * * * *